Jan. 16, 1945.  G. K. McKEE ET AL  2,367,593
MACHINE TOOL
Filed Aug. 3, 1940   6 Sheets-Sheet 2
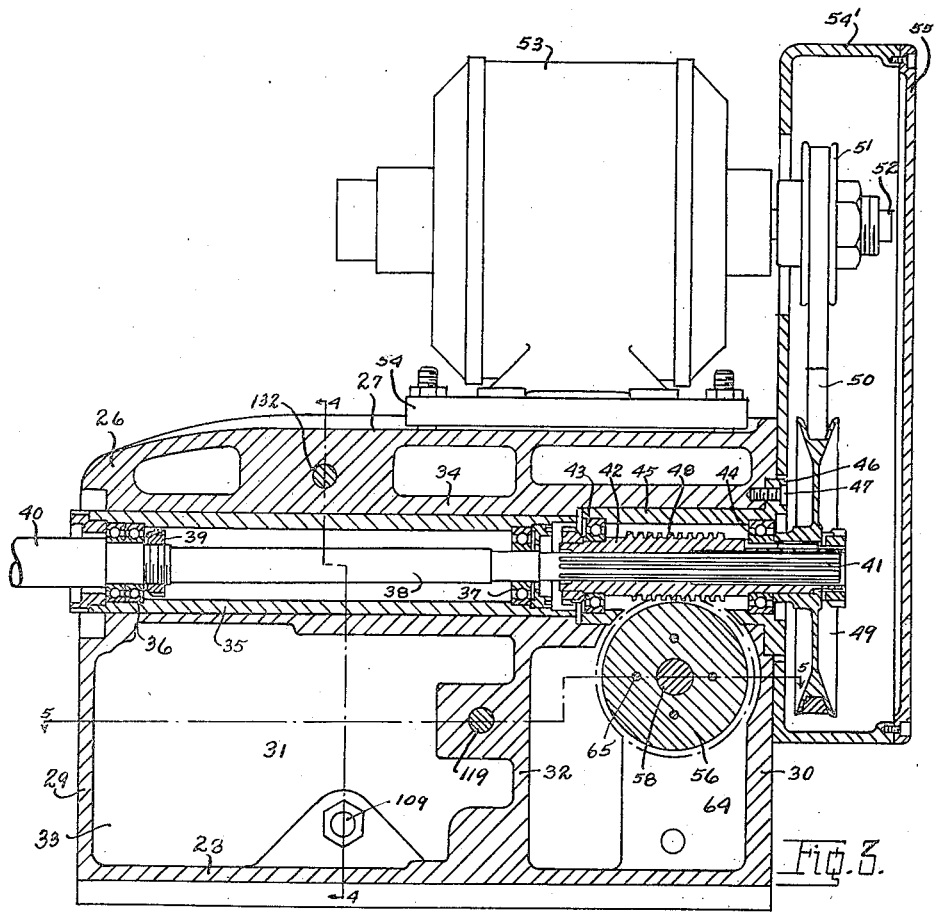
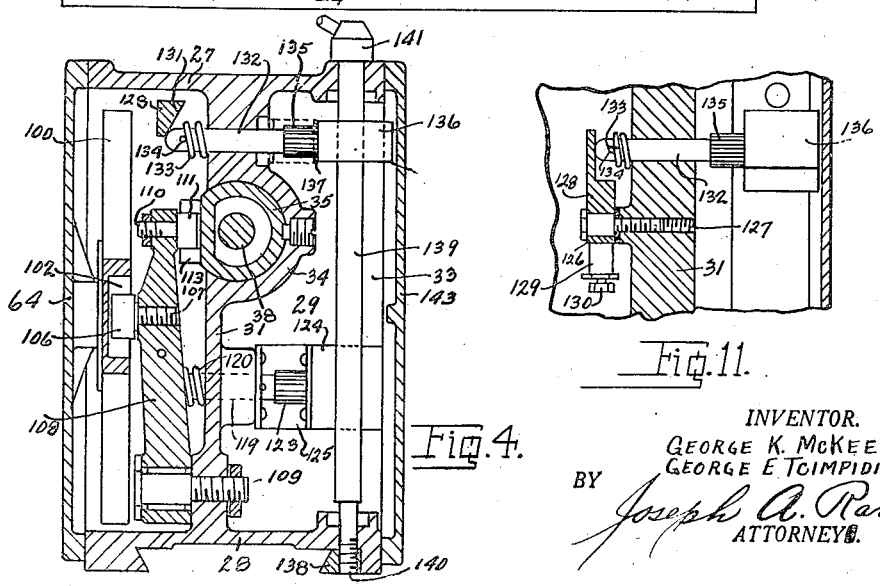
INVENTOR.
GEORGE K. McKEE
GEORGE E TCIMPIDIS
BY Joseph A. Rave
ATTORNEYS.

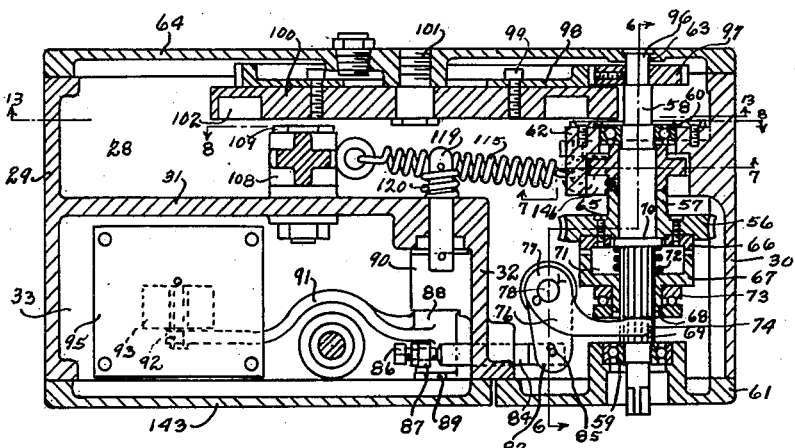
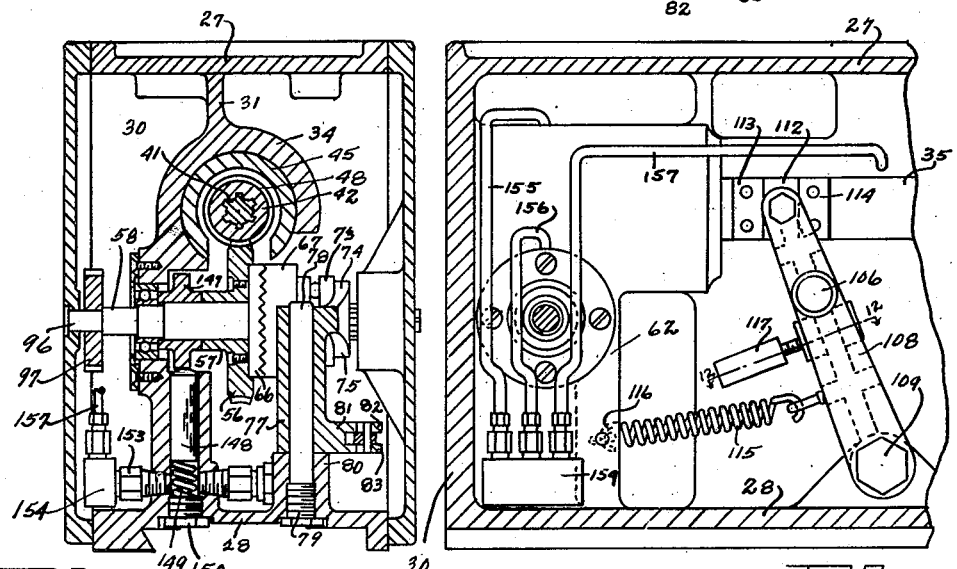
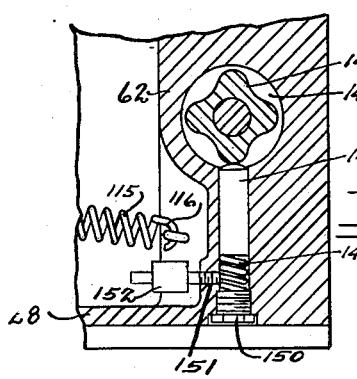

INVENTOR.
GEORGE K. MCKEE
GEORGE E. TCIMPIDIS
BY Joseph A. Rave
ATTORNEYS.

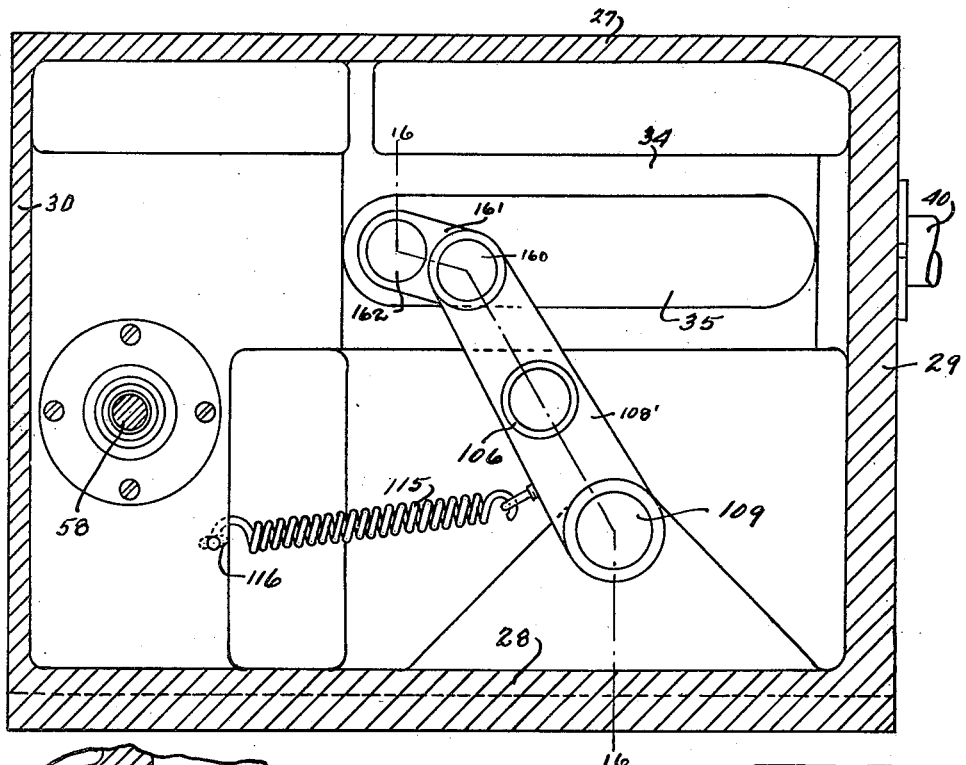
Fig. 15.
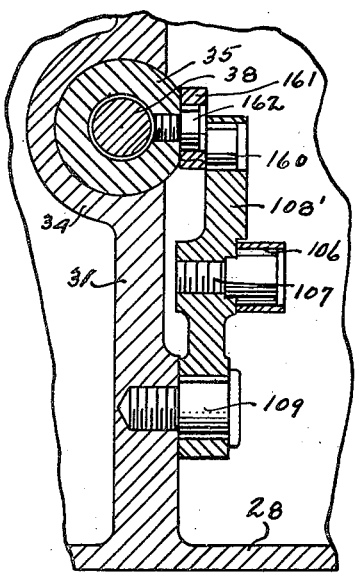
Fig. 16.
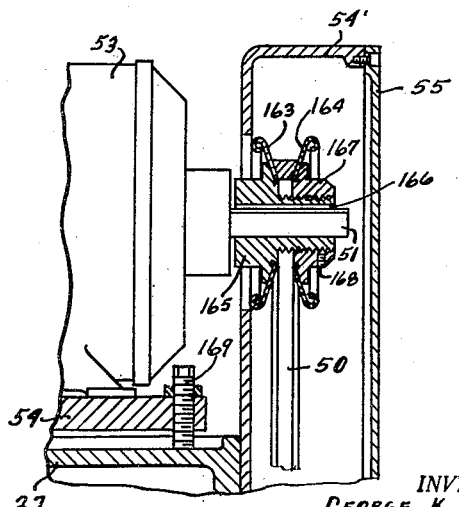
Fig. 17.

Patented Jan. 16, 1945

2,367,593

UNITED STATES PATENT OFFICE 2,367,593

MACHINE TOOL

George K. McKee and George E. Tcimpidis, Cincinnati, Ohio, assignors to The Avey Drilling Machine Company, Covington, Ky., a corporation of Ohio Application August 3, 1940, Serial No. 350,404

12 Claims. (Cl. 77—32)

This invention relates to improvements in machine tools, and particularly to improvements in drilling machines.

An object of this invention is the provision of a drilling machine unit capable of use in various positions and on different types of beds, wherein use is made of a cam, particularly a face type cam, for effecting the movement of the spindle and the tool carried thereby.

Another object of this invention is the provision of a cam feed unit that is compact in nature and will take up a minimum amount of space while producing a maximum amount of work.

It is another object of this invention to provide a cam type feed unit which can be readily adapted for performing continuous operations, intermittent operations, and readily adapted for performing either straight drilling operations or tapping operations, if desired.

It is a further object of this invention to provide such a unit as above referred to which is completely self-contained and thereby readily mountable on any type of support or supporting bed.

It is a still further object of this invention to provide a cam feed type of unit that may be readily changed for performing different cycles of operation, that is, different depths of drilling and tapping, without in any wise materially changing the construction and component parts of the unit.

It is also a further object of this invention to provide a cam feed unit for accomplishing the foregoing objects, which is relatively economical to manufacture and simple to operate and maintain.

Other objects and advantages of the present invention should be readily apparent by reference to the following specification considered in conjunction with the accompanying drawings forming a part thereof, and it is to be understood that any modifications may be made in the exact structural details there shown and described, within the scope of the appended claims, without departing from or exceeding the spirit of the invention.

In the drawings—

Fig. 3 is a longitudinal, vertical, sectional view through the unit, taken on line 3—3 of Fig. 2.

Fig. 4 is a vertical, transverse, sectional view through the unit, taken on line 4—4 of Fig. 3.

Fig. 5 is a horizontal, longitudinal, sectional view, taken on line 5—5 of Fig. 3.

Fig. 6 is a view similar to Fig. 4, but taken on a plane to the right of Fig. 4, on line 6—6 of Fig. 5.

Fig. 7 is a fragmentary, sectional view through the oiling pump, taken on line 7—7 of Fig. 5.

Fig. 8 is a fragmentary, longitudinal view, mostly in elevation, taken on line 8—8 of Fig. 5.

Fig. 11 is a fragmentary, sectional view, taken on line 11—11 of Fig. 10.

Fig. 15 is a view similar to Fig. 8 showing a modification in the mounting and attachment of the feed arm to the spindle.

Fig. 16 is a fragmentary sectional view taken on line 16—16 on Fig. 15.

Fig. 17 is an enlarged sectional view through the pulley on the motor.

Throughout the several views of the drawings, similar reference characters are employed to denote the same or similar parts.

Figure 2:
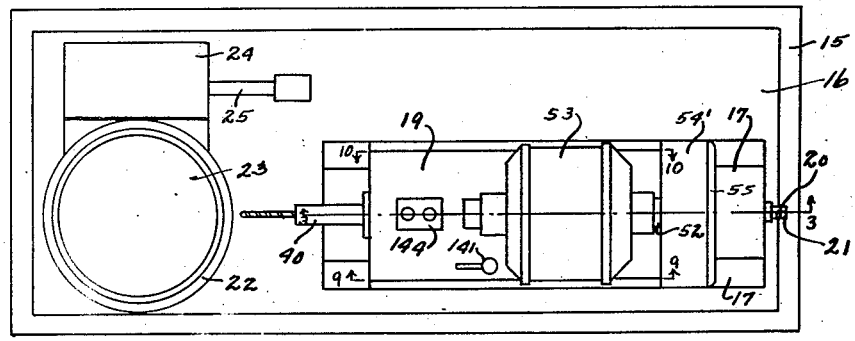
Fig. 2 is a top plan view of the machine illustrated in Fig. 1.

As was noted above, this invention pertains primarily to a spindle feeding mechanism, and particularly to a cam controlled feeding mechanism, wherein the cam is of the face type, that is, the cam disc has a cam track let into one side or face thereof. This unit is illustrated in the drawings as forming a part of a complete machine, but it will be understood that the particular form of bed and auxiliary mechanism disclosed in the drawings is by way of example only, since the unit may be mounted on all types or kinds of beds or other supporting structures. The drawings illustrate a machine having but a single unit, but it is to be understood that the unit may be multiple, that is, two or more on a single bed for simultaneous operation on a single work piece or each performing a successive operation on similar but different work pieces.

Figure 1:
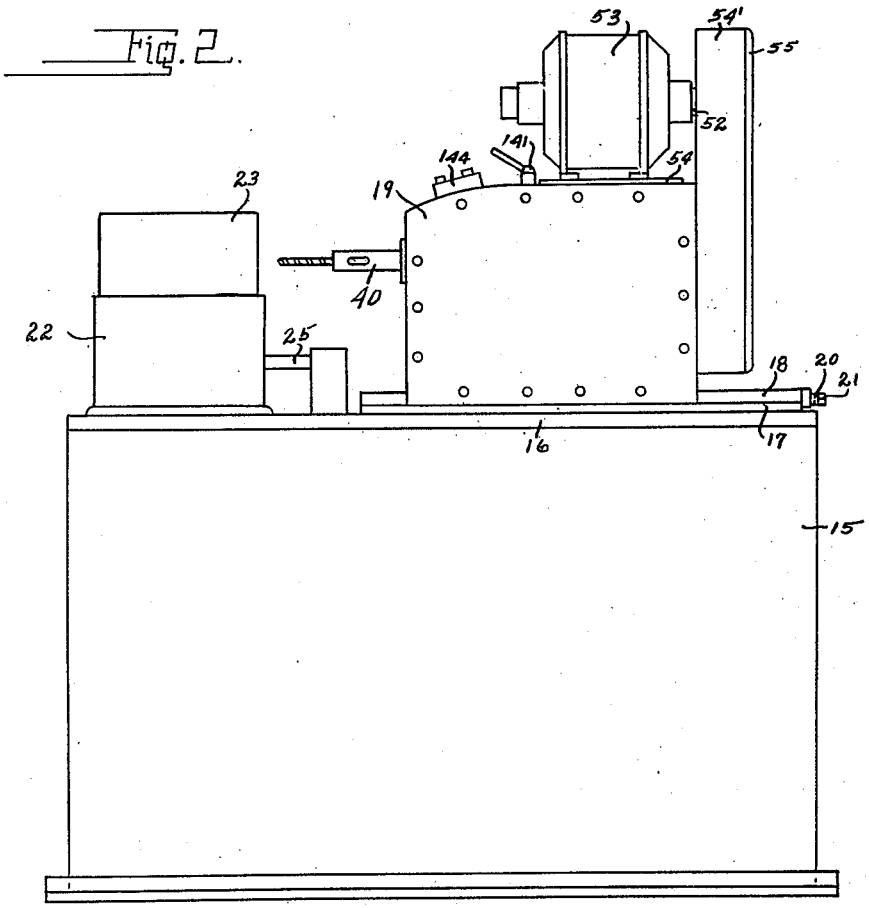
Fig. 1 is a side elevation of a machine embodying the improvements of this invention.

Specifically referring to the drawings, and particularly to Figs. 1 and 2, there is illustrated a rectangular supporting frame or bed 15 having at its upper end a bed plate 16. Secured to the bed plate 16, at one end thereof, is a fixed slide 17 provided on its upper surface with a guiding tongue, here shown as substantially dove tailed in cross section, 18. Mounted on the guiding tongue 18 is the unit 19 for feeding the spindle and tool relative to the work. The unit 19 may be adjustable relative to the slide 17 by means of an adjusting screw 20 adapted to be rotated by the engagement of its angular end 21 by a wrench (not shown) whereby the adjusting screw 20 is rotated. The adjusting screw 20 is threadedly received by a suitable nut (not shown), carried by the unit 19.

The bed plate 16, at its other end, is provided with a suitable work support which may take any convenient form, and may comprise a work supporting table 22 for supporting a work fixture 23. If desired, the work supporting table may be of the indexing type and may have projecting therefrom a housing 24 enclosing the indexing mechanism (not shown) operable from a shaft 25 which would in turn be connected with a suitable operating mechanism which may be associated with the spindle feeding unit or housed within the bed 15.

The spindle feeding unit 19 comprises a cored housing 26 which has a top 27, a bottom 28 and a front and rear end 29 and 30, with the sides open. Extending longitudinally of the housing, substantially centrally thereof, and for a greater part of its length, is a wall 31 connected at its inner end by a transverse wall 32 and thereby forming within the housing or shell 26 a compartment 33, in which, as will later be made clear, is mounted the electric operating and control mechanism. Above the longitudinal wall 31, there is provided a bearing sleeve 34 in which is mounted for axial movement a quill 35.

The quill 35 is counter bored at each end for the reception of suitable anti-friction bearings 36 and 37 in which is rotatably mounted the spindle 38. The usual nuts and the like 39 are provided for securing the spindle 38 against independent axial movement relative to the quill 35. The forward end of the spindle 38 is provided with the usual tooling receiving clutch, socket, sleeve or the like 40 while its rear end has projecting therefrom a splined portion 41. The splined portion 41 of the spindle 38 has its splines received, as is usual practice, in key-ways formed interiorly of a sleeve 42, and which sleeve 42 is rotatably mounted in anti-friction bearings 43 and 44 secured to a bushing 45. The bushing 45 is let into an enlarged bore in axial alignment with the quill bore in the bearing sleeve 44 and the bushing has at its rear end a radial flange 46, through which passes suitable anchoring screws 47 for securing the bushing to the rear wall 30 of the housing 26. The sleeve 32 is provided within the bushing 45 with a worm 48 shown in the drawings as integral therewith and the sleeve 42, beyond the bushing 45, has keyed or otherwise secured to an extending portion a pulley 49 provided in its periphery with a V-shaped groove for receiving a V-shaped belt 50.

The V-belt 50 is in turn trained about a suitable pulley 51 keyed or otherwise secured to the end 52 of a motor shaft projecting from a motor 53. The motor 53, as is usual, is mounted on a motor base 54, in turn secured to the top 27 of the unit housing 26. Secured to the rear wall 30 of the unit housing 26 is a guard 54' suitably closed by cover plate 55, thereby completely enclosing and protecting the pulleys 49 and 51 and encircling belt 50.

The worm 48 meshes with a worm wheel 56 loosely mounted through its projecting sleeve 57 on a transverse shaft 58. The shaft 58 is mounted in anti-friction bearings 59 and 60. The bearing 59 is supported by a closure plate 61, which closes the side of the unit beyond the compartment 33, while the anti-friction bearing 60 is supported by a lug 62 inwardly projecting from the rear wall 30 of unit housing 26. In addition, the rear end of the shaft 58 is mounted in a plain bearing 63 formed in a closure plate 64 which closes the rear side of the unit housing 26.

Secured to one side of the worm wheel 56, as by screws 65, is one member of clutch 66 which has its teeth meshing with complementary teeth of a second clutch member 67. The clutch member 67 is provided with a sleeve 68 having key ways therein receiving splines 69 formed on the transverse shaft 58 between a flange 70 thereon and the anti-friction bearing 59. The clutch members 66 and 67 are so formed as to provide hollow interior 71 in which is disposed an expansion spring 72 which has its one end abutting the shaft flange 70 and its other end abutting the clutch member 67. The spring 72 tends to shift the clutch member 70 relative to the shaft 58 on the splines 69 to thereby separate the clutch members and disengage the worm wheel 56 from the shaft 58.

In order to hold the clutch members 66 and 67 into engagement with one another, the clutch member sleeve 68 is provided exteriorly thereof with anti-friction thrust bearing 73, against which the fingers 74 and 75 of a bifurcated arm 76 abuts. The bifurcated arm 76 is secured to or integral with a sleeve 77, oscillatably mounted on a stud 78 which has its lower end threaded, as at 79, and threaded into a suitable tapped aperture in a lug 80 upstanding from the bottom 28 of the unit housing 26. The lower end of the sleeve 28 has projecting from it a second bifurcated arm 81 between the fingers 82 and 83 of which is one end of a pin or plunger 84. The pin or plunger 84, and fingers 82 and 83 being respectively provided with an aperture in alignment for the reception of a pivot pin 85, and whereby the arm 81 and pin or plunger 84 are connected to one another. Due to the arcuate movement of the arm 81 relative to the straight line movement of the pin or plunger 84, the aperture in the fingers 82 and 83 is elongated to permit the operation of the parts. The pin or plunger 84 is mounted for axial movement in a bore provided in the transverse wall 32 and a boss projecting from said wall and with the free end of the pin or plunger 84 disposed within the compartment 33.

Figure 9:
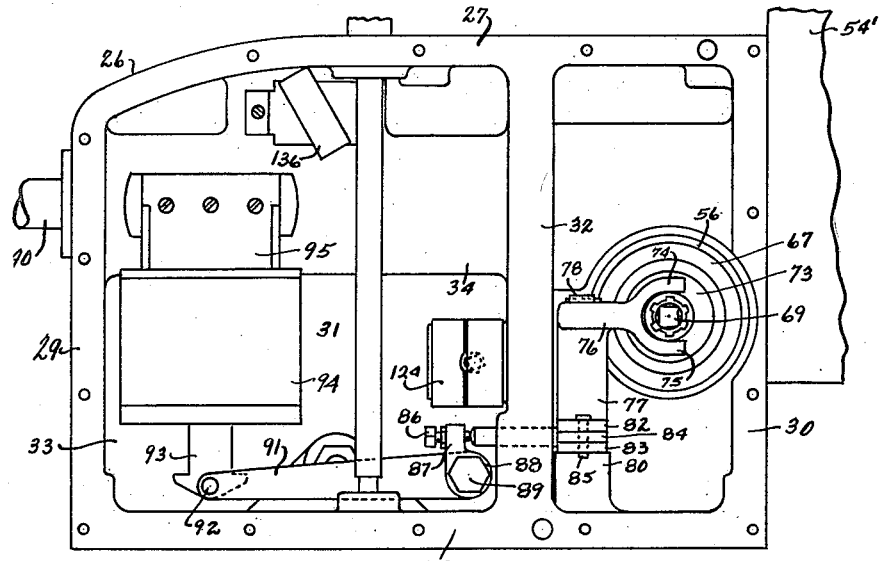
Fig. 9 is an elevational view interiorly of the unit, as seen by removing one of the unit side plates, and taken on line 9—9 of Fig. 2.

As seen in Figs. 5 and 9, the inner or free end of the plunger 84 abuts an adjusting screw 86, adjustably threaded into the upper end of an arm 87 which is integral with a sleeve 88 oscillatably mounted on a stud 89 threaded into a boss 90 projecting into the compartment 33 from the wall 32. Extending from the sleeve 88, at right angles to the arm 87, is a lever 91 which has its other end pivoted at 92 to the core 93 of a solenoid 94. The solenoid 94 is carried by a bracket 95, in turn bolted or otherwise secured to the outer surface of the bearing sleeve 34.

Referring now to Fig. 5, the rear end of the transverse shaft 58 is reduced, as at 96, and has pinned or otherwise secured thereto a pinion 97 meshing with the teeth of a ring gear 98. The ring gear 98 is fastened by suitable screws 99 to the outer face of a disc 100. The disc 100 is loosely mounted for rotation on a stud 101 threaded into a suitable boss projecting from the rear closure plate 64.

Figure 13:
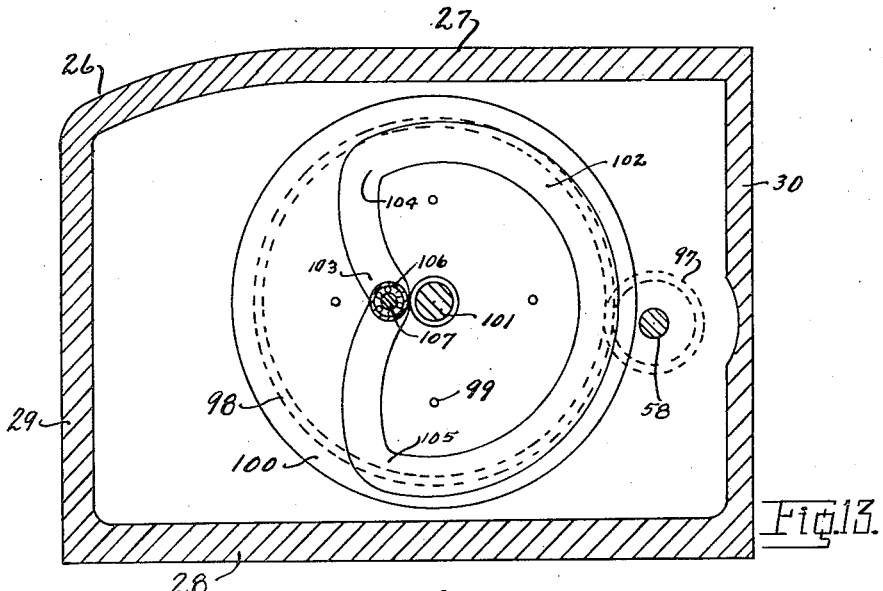
Fig. 13 is a view, partly in section and partly in elevation, illustrating the face of the cam which effects the feeding of the spindle and tool.
Figure 14:
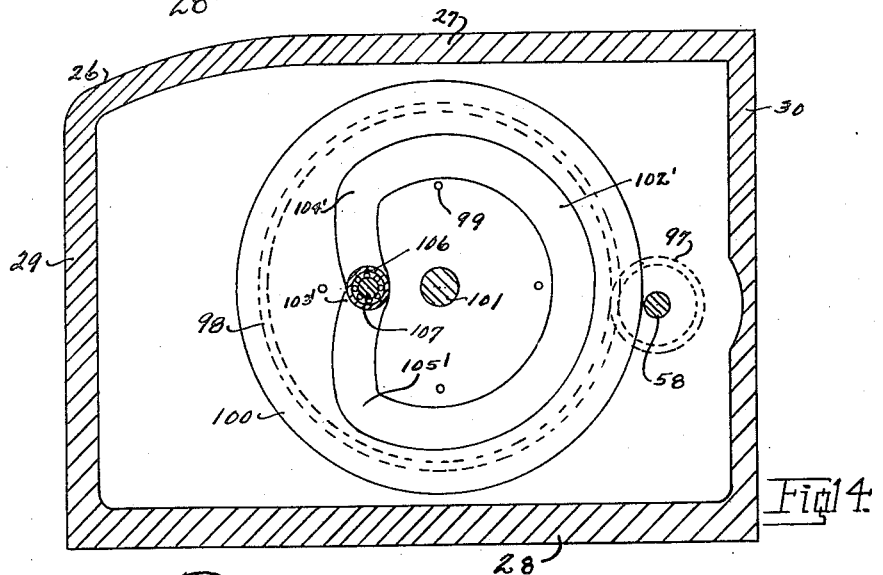
Fig. 14 is similar to Fig. 13, but illustrating a slight modification in the cam track, such as might be used for drilling operations, while that of Fig. 13 would be employed for tapping operations.

The disc 100 has, in its inner face, a groove or cam track 102, which may take the form of that shown in either Figs. 13 or 14, or some similar modification of these forms. As will be seen in Fig. 13, the cam track 102, at the point 103, is very close to the center of the disc, and from this point, to point 104, rapidly approaches the outer edge of the disc where the approach to the point 105 is very gradual, followed from the point 105 back to the point 102 with a rapid retraction from the periphery to the center of the disc. As will later be made clear, the portion of the cam track between the points 103 and 104 effect the rapid advance of the tool spindle, followed by a slow feeding movement of the spindle between the points 104 and 105, whereupon the portion of the cam track between 105 and 103 rapidly retract the spindle.

Disposed within the cam track 102 is a roller 106 mounted on needle bearings on a stud 107, see Fig. 4, carried by a lever 108 intermediate the ends thereof. The lever 108 has its lower end mounted on needle bearings around a stud 109 which is threaded into the compartment wall or partition 31. The upper end of the lever 108 carries a second stud 110 on which is mounted, as by needle bearings, an anti-friction roller 111 adapted to be received, see Fig. 8, in the passage way 112 formed between blocks 113 and 114, secured to a flattened side of the quill or spindle sleeve 35. In order to have access to this quill 35, a portion of the bearing sleeve 34 is removed along an axial line and to the rear thereof, as clearly illustrated in Fig. 4. In order to take up any play that may be between anti-friction roller 106 and cam track 102, the arm 108 has connected therewith one end of a spring 115, the other end 116 of which is permanently anchored to a portion of the unit housing 26.

Figure 12:
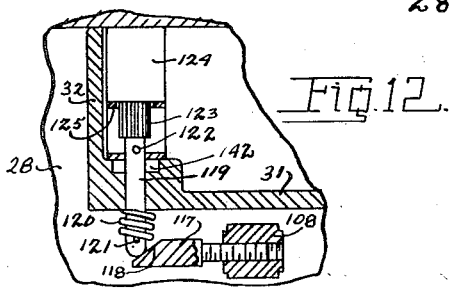
Fig. 12 is a fragmentary, sectional view, taken on line 12—12 of Fig. 8.

Mounted on and projecting from one side of the arm 108, see Figs. 8 and 12, is a finger 117 having one face thereof cam shaped or inclined as at 118, and adapted in its movement with the arm 108 to engage and axially shift a switch plunger 119. The plunger 119 is mounted for sliding movement in a bearing provided by the compartment wall 33, and beyond the compartment the plunger 119 has encircling it a coil spring 120 abutting on one end with the partition 31 and on its other end with a pin 121 extending transversely of the plunger. Within the compartment 33, the plunger 119 has a second transverse pin 122 which limits the movement of the plunger under the influences of the spring 120. Abutting the inner end of the plunger 119 is the movable element 123 of a limit switch 124 which is mounted in position within the compartment 33 by a bracket 125.

Figure 10:
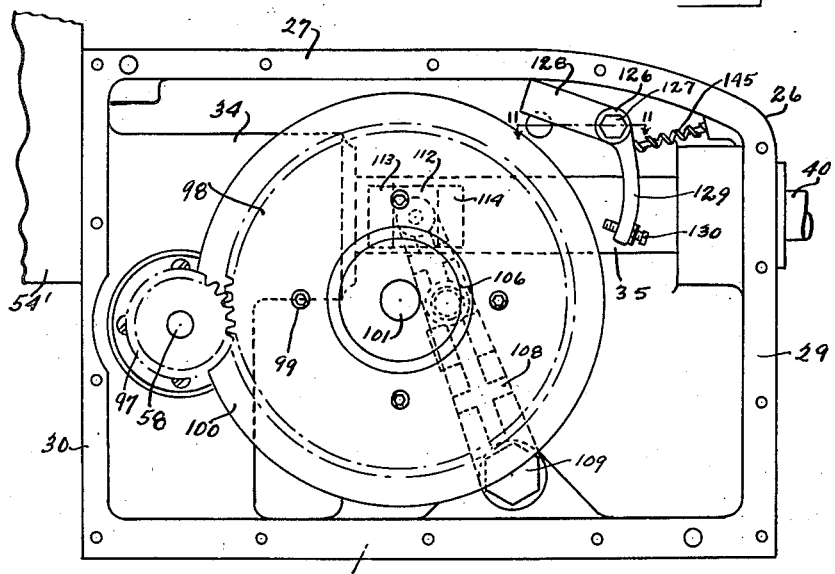
Fig. 10 is a view similar to Fig. 9, but taken from the opposite side of the unit, on line 10—10 of Fig. 2.

Referring now to Fig. 10, there is illustrated in the upper right hand corner, a bell crank lever 126, pivotally mounted by stud 127 having projecting from one side of the pivot a finger 128 and from its other side a lever 129. The lever 129 carries at its free end an adjustable abutment screw 130 adapted to be engaged by the upper end of the arm 108 at one end of its movement. The finger 128, see Fig. 4, has an incline or cam face 131 adapted to axially shift a plunger 132 against the yielding resistance of a spring 133 encircling said plunger, and said spring abutting on one end with the partition wall 31 through which the plunger axially shifts, and abutting on its other end with a pin 134 extending transversely of the plunger. The inner end of the plunger 132 abuts the movable element 135 of a limit switch 136 mounted in position by a bracket 137 carried by the compartment partition 31.

In order to secure the unit in position on the dove-tailed guide 38, the complementary guideway in the unit has one of its sides formed by a movable gib 138 and adapted to be drawn tightly against one of the sides of the dove-tailed guide 18. For this purpose, a clamp bar 139 extends vertical of the unit and has its lower end 140 threaded into the gib 138 and its upper end provided with the usual handle 141 for rotating the clamping bar 39. It is to circumvent this clamping bar 139 that the lever 91 is offset or curved as illustrated in Fig. 5.

From the foregoing, it will be noted that the limit switches and solenoids are all within the compartment 33, shut off from the other mechanism. It should be noted that around each of the shafts, studs, and the like, which pass through the partition of the compartment 33, there is provided a recess such as 142 around the plunger 119 for the reception of a suitable oil seal. From this, it will be noted that the compartment 33 is oil tight and whereby the electrical control equipment therein is protected from harm. In order to close the said compartment, use is made of a closure plate 143.

The operation of this mechanism is as follows:

Mounted on the top wall 27 of the unit housing 26, is a starting switch 144, connected with the usual electric panels associated with a machine tool, and having the usual starting and running magnets for the motor 53, as well as the magnetic control switch for the solenoid 94. Operation of the switch 144 therefore starts the rotation of the motor 53 and retracts the core 93 for oscillating the lever 91 and arm 87 and thereby axially shifting the pin or plunger 84 to the right, as seen in Fig. 5, and oscillating the sleeve 77 in a counterclockwise direction, as seen in Fig. 5, to cause the bifurcated arm 76 to close clutch elements 66 and 67 against the expansion of spring 72. This then clutches the worm wheel 56 to the transverse shaft 58. The worm wheel being constantly in mesh with the worm 48, is driven by said worm which is rotated through the pulleys 49 and 51, and encircling belt, by the motor 53.

The spindle and tool carried thereby are likewise rotated by the worm 58 through the spline portion 41 of the spindle.

Rotation of the shaft 58 drives the pinion 97, which, through the ring gear 98, rotates the cam disc 100. The cam disc 100, through its cam track 102, as above described, first rapidly advances the quill 35 and thereby the spindle and tool carried thereby toward the work, which is followed by a slow feed advance by the cam track.

With the mechanism above described, this slow feed continues until the upper end of the lever 108 engages with the stop screw 103 of lever 129 of bell crank 126, whereupon the bell crank 126 is oscillated in a counterclockwise direction about the stud 127 for lowering the finger 128. Finger 128 axially shifts plunger 132 to the right, as seen in Fig. 4, for closing the switch 136, which switch is connected with the electric panel of the machine tool for reversing the direction of rotation of the motor 53 and thereby reversing the rotation of the cam disc 100 and retracting the spindle.

This slow retraction of the spindle is necessary for backing off a tap after a tapping operation had been performed. When performing drilling operations, as will later be made clear, this slow retraction is not needed or resorted to.

The return of the spindle takes place rapidly after the tap has left the work and when the roller 106 is passing through the cam track between the points 104 and 103. When the roller 106 has substantially reached the point 103, the finger 117 on the lever 108 engages plunger 119 for operating the switch 124 and thereby cutting out the motor 53 and de-energizing the electromagnet 94. The de-energization of the electromagnet 94 releases the pressure on the spring 72 which expands to separate clutch elements 66 and 67 and cause a stopping in rotation of the transverse shaft 58 and thereby a stopping in rotation of the cam disc 100 and the parts operated thereby. A work piece may now be replaced in the work holder 23, whereupon the cycle is repeated by the operation of the switch 144. It should be noted that upon retraction of the arm 108 and release of the stop screw 130, the bell crank 126 was returned to its normal position by means of coil spring 145 which has its one end abutting the lever 129 and its other end abutting the housing 26 and exerts its force to oscillate the bell crank 126 in a clockwise direction.

As was noted above, the cam track 102, illustrated in Fig. 13 was employed to effect a tapping operation and may therefore be said to be a typical cam track for this type, that is tapping, of operations. The cam track 102', illustrated in Fig. 14, likewise may be referred to as a typical cam track for ordinary drilling operations, and as a matter of fact is quite similar to the cam track 102. The cam track 102' therefore has a low spot 103', at which point the spindle and tool carried thereby are completely retracted and from which point, to point 104', is a rapid rise for rapidly advancing the spindle. The cam track from the point 104' to the point 105' is a slow rising cam for feeding the spindle at a normal feeding rate and is followed, between the point 105' and 103', with a rapid retracting portion. As was further noted above, when performing ordinary drilling operations, the spindle is rapidly advanced to the work, slowly fed through the work and rapidly retracted from the work, and to perform this type of operation, the bell crank 126 is eliminated from the machine, as is the limit switch 136.

In drilling operations therefore, the starting switch 144 is operated, whereupon the spindle is rapidly advanced, slowly fed and rapidly retracted relative to the work, until the finger 117 of the arm 118 operates the stopping switch 124 to permit replacement of the finished work piece.

When performing either tapping or drilling operations, the interior of the unit housing 26, with the exception of the compartment 33, is utilized as an oil reservoir for the lubrication of the bearings of the several rotating parts. To accomplish this, the inwardly projecting boss or lug 62 is hollowed out to provide a chamber 146 which is immediately behind the anti-friction bearing 60 and illustrated most clearly in Figs. 5 and 7. The transverse shaft 58 passes through this chamber 146 and has pinned or otherwise secured thereto a multi-lobed cam 147, which engages the upper end of a pump plunger 148 which has its lower end resting on one end of a compression spring 149. The other end of the spring 149 is engaged by a plug 150. Entering the compartment between the plug 150 and lower end of the pump plunger 138 is a supply port 151 provided with a one-way check valve 152 and through which lubricant is drawn by the pump plunger 148 when elevated by the spring 149. The other side of the compartment 139 is likewise provided with a one-way check valve 153 which empties into a lubricating distributor 154, and from which distributor extend pipes 155, 156 and 157. The pipe 155 discharges onto the worm 148 and suitably lubricates the various bearings associated therewith, while the pipe 156 discharges to the bearings of the transverse shaft 58 for suitably lubricating the same, and the remaining pipe 157 supplies lubricant to the quill 35 to lubricate the axial movement relative to the bearing sleeve 34.

In the modification shown in Figs. 15 and 16 the arm 108' has its upper end pivotally connected at 160 with one end of a link 161. The link 161 has its other end pivotally connected at 162 to the spindle quill 35.

By this construction a more direct axial pull is effected on the spindle quill instead of a slight side thrust as is the result with the construction above described. In addition the construction in Fig. 15 gives a slightly longer stroke within the bearing thrust forces over that of the construction of Fig. 8.

In order to obtain a variation in the speed from the motor to the spindle the pulley 51 may be formed as shown in Fig. 17. As there shown the pulley 51 comprises a pair of pulley sides 163 and 164 the former of which is suitably secured to a collar 165 which has projecting therefrom the threaded sleeve 166. The collar and sleeve 165 and 166 are provided with a key way for the key for securing same to the motor shaft 51. The other pulley side 164 is keyed or otherwise secured to a nut 167 threaded onto the sleeve 166. In order to secure the pulley side 164 in position use is made of a lock screw 168 extending through the nut 167 and impinging on the sleeve 166.

It will be understood that the screwing of the nut 167 and pulley side 164 toward the collar 155 and pulley side 163 the V-shaped passage of the pulley 51 is reduced in size thereby causing the belt 50 to ride higher in the said pulley passage and in effect giving a larger pulley to the motor and thereby changing the ratio between the motor pulley and the spindle pulley.

It will be appreciated that this shift in size of motor pulley diameter will change the length of belt necessary between these pulleys. In order to accomplish this the motor base 54 is mounted for adjustment by means of jack screws 169 to thereby change the center distance between the motor and spindle so that the same belt may be employed for this shift in pulley sizes.

From the foregoing, it will be appreciated that there has been provided a self-contained cam feed mechanism, particularly adapted for drilling, tapping and similar operations, and which is relatively inexpensive to manufacture, simple in construction and readily adaptable for the purposes originally set forth, and otherwise accomplishing the objects initially set forth.

What is claimed is:

1. In a machine tool organization, the combination of a support, a work holder, and a tool unit comprising an axially shiftable spindle, an arm having a pivotal connection at one end within the unit and at its other end with the spindle, a rotatable face cam connected with the arm intermediate its pivotal connections for oscillating said arm and shifting the spindle, a common drive means for rotating the spindle and cam, and means associated with the arm for stopping the driving means at a given point in its movement while axially shifting the spindle.

2. In a machine tool organization of the class described, a tool controlling unit comprising a housing, a rotatable spindle mounted in said housing for axial movement in opposite directions relative thereto and including a quill, a pivotally mounted arm within said housing adapted for oscillating movement, said arm having one end pivotally connected with the spindle quill for changing its oscillations to reciprocations of the quill and spindle, a face cam connected with the arm for effecting its oscillation, means for rotating the cam including a separable clutch and an electric prime mover, electro-magnetic means for maintaining the clutch in operative relation, and means for stopping the electric prime mover and de-energizing the electro-magnetic means, whereupon the rotation of the cam disc is stopped.

3. In a machine tool organization of the class described, a tool controlling unit comprising a housing, a rotatable spindle mounted in said housing for axial movement in opposite directions relative thereto and including a quill, a pivotally mounted arm within said housing adapted for oscillating movement, said arm having one end pivotally connected with the spindle quill for changing its oscillations to reciprocations of the quill and spindle, a face cam connected with the arm for effecting its oscillation, means for rotating the cam including a separable clutch and an electric prime mover, electro-magnetic means for maintaining the clutch in operative relation, means for stopping the electric prime mover and de-energizing the electro-magnetic means, whereupon the rotation of the cam disc is stopped, and yieldable means for separating the clutch upon de-energization of the electro-magnetic means.

4. In a machine tool organization of the class described, a spindle reciprocating mechanism, comprising a housing, a spindle mounted therein for rotation and reciprocation, a pivotally mounted oscillatable arm operatively connected with the spindle to change oscillations thereof into reciprocations, a cam disc for effecting the oscillation of the arm and a drive mechanism for rotating the cam disc, including a drive shaft, a pair of clutch members, electro-magnetic means for maintaining the clutch members in operative position, and a control switch operable by the oscillating arm for de-energizing the electro-magnetic means and yielding means for separating the clutch members and stopping rotation of the driven shaft and cam disc.

5. In a machine tool organization of the class described, a spindle reciprocating mechanism, comprising a housing, a spindle and quill mounted therein for rotative and axial movement, an oscillatable arm connected with the quill in such a manner as to change its oscillations into reciprocations of the quill, a cam disc for oscillating the arm, said cam disc rapidly advancing the quill a part of the way in a given direction and then slowly feeding the same in said direction, an electric motor for rotating the spindle and driving the cam disc, and means operable by the oscillatable arm for reversing the direction of drive of the motor and therefore reversely oscillating the arm and retracting the quill, first at a slow rate and then at a rapid rate to its initial position.

6. In a machine tool organization of the class described, a spindle reciprocating mechanism, comprising a housing, a spindle and quill mounted therein for rotative and axial movement, an oscillatable arm connected with the quill in such a manner as to change its oscillations into reciprocations of the quill, a cam disc for oscillating the arm, said cam disc rapidly advancing the quill a part of the way in a given direction and then slowly feeding the same in said direction, an electric motor for rotating the spindle and driving the cam disc, means operable by the oscillatable arm for reversing the direction of drive of the motor and therefore reversely oscillating the arm and retracting the quill, first at a slow rate and then at a rapid rate to its initial position, and additional means operated by the arm for stopping the reciprocations of the spindle and rotation of the disc.

7. In a machine tool organization of the class described, a spindle reciprocating mechanism, comprising a housing, a spindle and quill mounted therein for rotative and axial movement, an oscillatable arm connected with the quill in such a manner as to change its oscillations into reciprocations of the quill, a cam disc for oscillating the arm, said cam disc rapidly advancing the quill a part of the way in a given direction and then slowly feeding the same in said direction, an electric motor for rotating the spindle and driving the cam disc, means operable by the oscillatable arm for reversing the direction of drive of the motor and therefore reversely oscillating the arm and retracting the quill, first at a slow rate and then at a rapid rate to its initial position, additional means operated by the arm for stopping the reciprocations of the spindle and rotation of the disc, said last mentioned means including a limit switch, a separable clutch, and electro-magnetic means for holding the clutch against separation and de-energizable by the limit switch.

8. A self-contained cam feed unit for drilling and tapping spindles and the like, comprising a housing, a spindle mounted therein for rotative and axial movement relative thereto, an arm having one end pivoted within the unit about which the arm is oscillated and the other end pivotally connected to the spindle for changing the oscillations of the arm to reciprocations of the spindle, a cam disc rotatably mounted within the unit and connected to the arm and having a cam track whereby the arm is rapidly oscillated to rapidly advance the spindle from a retracted position and then slowly oscillated for slowly feeding the spindle, means operable by the arm during its slow oscillation for reversing the direction of rotation of the cam disc and reversing the oscillation of the arm at a slow speed followed by a rapid oscillation in a reverse direction, and means operable by the arm during its rapid retracting oscillation for stopping the rotation of the cam disc and the oscillations of the arm.

9. A self-contained cam feed unit for drilling and tapping spindles and the like, comprising a housing, a spindle mounted therein for rotative and axial movement relative thereto, an arm having one end pivoted within the unit about which the arm is oscillated and the other end pivotally connected to the spindle for changing the oscillations of the arm to reciprocations of the spindle, a cam disc rotatably mounted within the unit and connected to the arm and having a cam track whereby the arm is rapidly oscillated to rapidly advance the spindle from a retracted position and then slowly oscillated for slowly feeding the spindle, means operable by the arm during its slow oscillation for reversing the direction of rotation of the cam disc and reversing the oscillation of the arm at a slow speed followed by a rapid oscillation in a reverse direction, means operable by the arm during its rapid retracting oscillation for stopping the rotation of the cam disc and the oscillations of the arm, said last mentioned means including a separable clutch, and a mechanism operable by the arm to permit separation of the clutch.

10. A self-contained cam feed unit for drilling and tapping spindles and the like, comprising a housing, a spindle mounted therein for rotative and axial movement relative thereto, an arm having one end pivoted within the unit about which the arm is oscillated and the other end pivotally connected to the spindle for changing the oscillations of the arm to reciprocations of the spindle, a cam disc rotatably mounted within the unit and connected to the arm and having a cam track whereby the arm is rapidly oscillated to rapidly advance the spindle from a retracted position and then slowly oscillated for slowly feeding the spindle, means operable by the arm during its slow oscillation for reversing the direction of rotation of the cam disc and reversing the oscillation of the arm at a slow speed followed by a rapid oscillation in a reverse direction, means operable by the arm during its rapid retracting oscillation for stopping the rotation of the cam disc and the oscillations of the arm, said last mentioned means including a limit switch, a separable clutch, and electro magnetic means for holding the clutch against separation and de-energizable by the limit switch.

11. A self-contained feed unit for drilling and tapping spindles and the like, including a housing, an oil proof compartment within said housing, a spindle and quill bearing within said housing and above the compartment, a quill in said bearing for axial movement relative thereto, a spindle within the quill, an arm having one end pivoted within the housing and the other arm pivotally connected with the quill, means within the housing outside the compartment for rotating the spindle and oscillating the arm to axially shift the quill and spindle, a prime mover for driving the last mentioned means, and control mechanism within the compartment operable by the spindle and arm for affecting and controlling the operation thereof.

12. A self-contained feed unit for drilling and tapping spindles and the like, including a housing, an oil proof compartment within said housing, a spindle and quill bearing within said housing and above the compartment, a quill in said bearing for axial movement relative thereto, a spindle within the quill, an arm having one end pivoted within the housing and the other arm pivotally connected with the quill, means within the housing outside the compartment for rotating the spindle and oscillating the arm to axially shift the quill and spindle, a prime mover for driving the last mentioned means, control mechanism within the compartment operable by the spindle and arm for affecting and controlling the operation thereof, said housing outside of the compartment forming a lubricant reservoir, and means operable by the spindle and quill operating means for circulating the lubricant to the bearings thereof.

GEORGE K. McKEE.
GEORGE E. TCIMPIDIS.